(12) United States Patent
Schanko et al.

(10) Patent No.: US 12,069,593 B2
(45) Date of Patent: Aug. 20, 2024

(54) METHOD FOR CONTROLLING RADIO FREQUENCY EMISSIONS

(71) Applicant: Nokia Solutions and Networks Oy, Espoo (FI)

(72) Inventors: Ralf Schanko, Dusseldorf (DE); Harald Steinhaus, Neu-Ulm (DE); Alois Herzog, Nantes (FR); Christophe Grangeat, Viroflay (FR)

(73) Assignee: Nokia Solutions and Networks Oy, Espoo (FI)

( * ) Notice: Subject to any disclaimer, the term of this patent is extended or adjusted under 35 U.S.C. 154(b) by 329 days.

(21) Appl. No.: 17/632,545

(22) PCT Filed: Aug. 6, 2019

(86) PCT No.: PCT/EP2019/071104
§ 371 (c)(1),
(2) Date: Feb. 3, 2022

(87) PCT Pub. No.: WO2021/023375
PCT Pub. Date: Feb. 11, 2021

(65) Prior Publication Data
US 2022/0279463 A1    Sep. 1, 2022

(51) Int. Cl.
*H04B 7/00* (2006.01)
*H04W 52/14* (2009.01)
*H04W 52/36* (2009.01)

(52) U.S. Cl.
CPC ....... *H04W 52/367* (2013.01); *H04W 52/143* (2013.01)

(58) Field of Classification Search
CPC .......... H04W 52/367; H04W 52/0219; H04W 52/0212; H04W 52/143; H04W 52/30; H04W 52/346
See application file for complete search history.

(56) References Cited

U.S. PATENT DOCUMENTS

| | | | |
|---|---|---|---|
| 8,055,292 B1 | 11/2011 | Vargantwar et al. | 455/522 |
| 11,217,995 B2* | 1/2022 | Itaya | H02J 3/00 |
| 11,381,121 B2* | 7/2022 | Jung | H02J 50/12 |

(Continued)

FOREIGN PATENT DOCUMENTS

| | | |
|---|---|---|
| CN | 1429435 A | 7/2003 |
| CN | 106797616 A | 5/2017 |

(Continued)

*Primary Examiner* — Tuan Pham
(74) *Attorney, Agent, or Firm* — Harrington & Smith

(57) ABSTRACT

The present subject matter relates to a method for controlling radio frequency, RF, emissions, including maintaining a number of power units below a maximum number within a time interval, wherein a power unit of the power units is indicative of an amount of radiated power for transmission of data. A data element to be transmitted may be received during the time interval. A number of the power units representing an amount of radiated power for the transmission of the data element may be determined. The data element may be transmitted depending on the current maintained number of power units and the determined number. The current maintained number of power units may be decreased by the determined number of power units if the data element is transmitted.

19 Claims, 11 Drawing Sheets

(56) References Cited

U.S. PATENT DOCUMENTS

| | | | |
|---|---|---|---|
| 2004/0142715 A1 | 7/2004 | Oses | 455/522 |
| 2011/0077659 A1 | 3/2011 | Kim et al. | 455/574 |
| 2011/0275405 A1 | 11/2011 | Backman et al. | 455/522 |
| 2012/0021800 A1 | 1/2012 | Wilson et al. | 455/550.1 |
| 2014/0046496 A1* | 2/2014 | Mise | G06Q 10/06 700/291 |
| 2014/0086072 A1 | 3/2014 | Maaref et al. | 370/252 |
| 2014/0376488 A1 | 12/2014 | Saarinen et al. | 370/329 |

FOREIGN PATENT DOCUMENTS

| | | |
|---|---|---|
| CN | 107005952 A | 8/2017 |
| WO | WO 02/23762 A1 | 3/2002 |
| WO | WO-2019/126063 A1 | 6/2019 |

\* cited by examiner

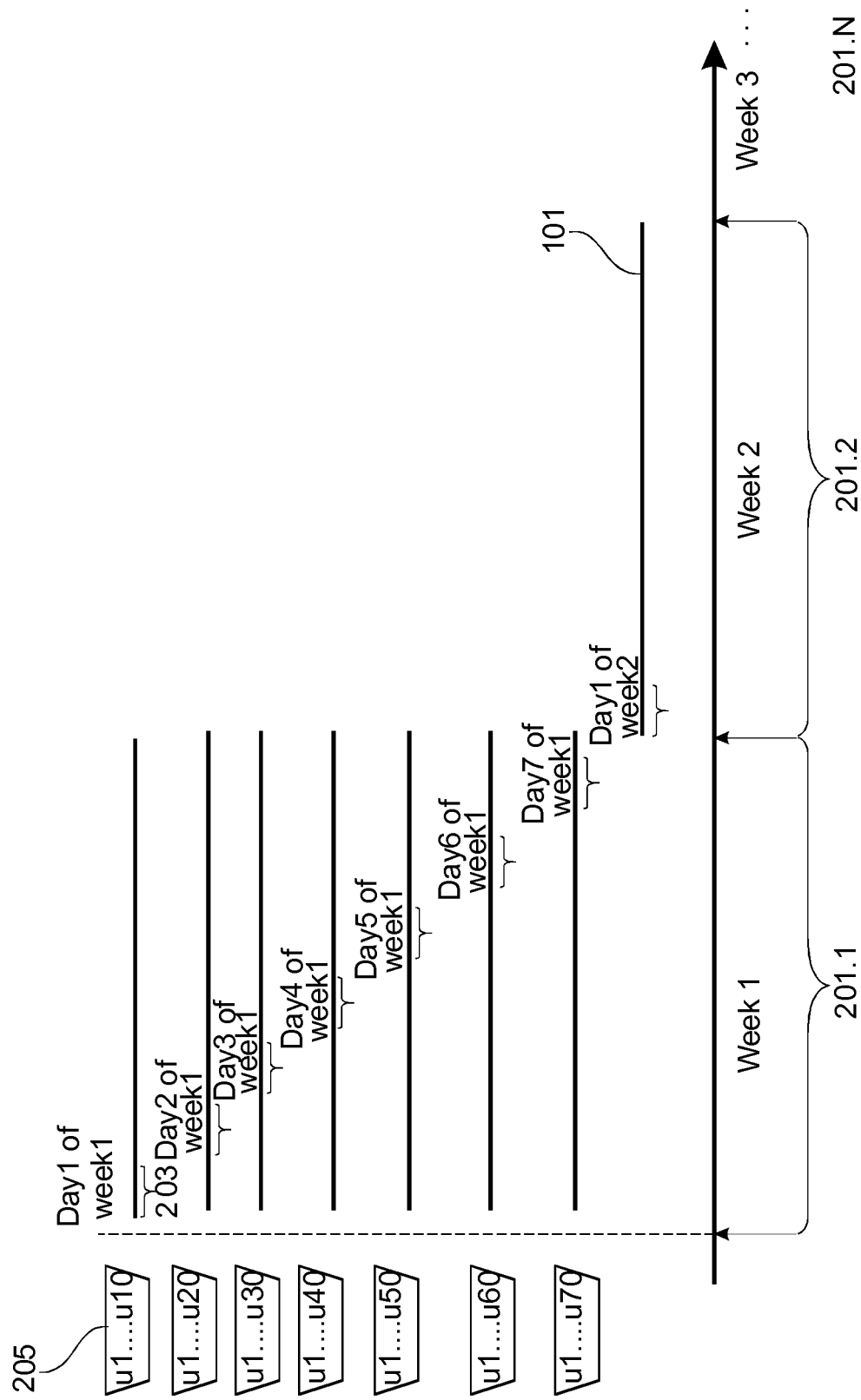

METHOD FOR CONTROLLING RADIO FREQUENCY EMISSIONS

CROSS REFERENCE TO RELATED APPLICATION

This patent application is a U.S. National Stage application of International Patent Application Number PCT/EP2019/071104 filed Aug. 6, 2019, which is hereby incorporated by reference in its entirety.

FIELD OF THE INVENTION

Various example embodiments relate to computer networking, and more particularly to a method for controlling radio frequency emission.

BACKGROUND

A manufacturer or other legal entity that will place a base station in the market is required to comply with international standards and local regulation concerning radio frequency (RF) exposures. International standards and local regulations require to keep a time-averaged RF exposure below a defined limit. However, with the introduction of beamforming in 4G and 5G mobile technologies, the RF emitted by radio base stations dynamically changes in intensity and direction based on user traffic and user equipment (UE) positions inside a cell area.

SUMMARY

Example embodiments provide a method for controlling radio frequency, RF, emissions, comprising: maintaining a number of power units below a maximum number within a time interval, wherein a power unit of the power units is indicative of an amount of radiated power for transmission of data, receiving during the time interval a data element to be transmitted, determining a number of the power units representing an amount of radiated power for the transmission of the data element, transmitting the data element depending on the current maintained number of power units and the determined number, and decreasing the current maintained number of power units by the determined number of power units if the data element is transmitted.

According to further example embodiments, an apparatus for controlling radio frequency, RF, emissions, comprises at least one processor; and at least one memory including computer program code. The at least one memory and the computer program code configured to, with the at least one processor, cause the apparatus at least to perform: maintaining a number of power units below a maximum number within a time interval, wherein a power unit of the power units is indicative of an amount of radiated power for transmission of data, receiving during the time interval a data element to be transmitted, determining a number of the power units representing an amount of radiated power for the transmission of the data element; transmitting the data element depending on the current maintained number of power units and the determined number, and decreasing the current maintained number of power units by the determined number of power units if the data element is transmitted.

According to further example embodiments, a computer program comprises instructions stored thereon for performing at least the following: maintaining a number of power units below a maximum number within a time interval, wherein a power unit of the power units is indicative of an amount of radiated power for transmission of data, receiving during the time interval a data element to be transmitted, determining a number of the power units representing an amount of radiated power for the transmission of the data element, transmitting the data element depending on the current maintained number of power units and the determined number, and decreasing the current maintained number of power units by the determined number of power units if the data element is transmitted.

BRIEF DESCRIPTION OF THE DRAWINGS

The accompanying figures are included to provide a further understanding of examples, and are incorporated in and constitute part of this specification. In the figures:

FIG. 2A depicts a diagram illustrating a method for managing power units in accordance with an example of the present subject matter;

DETAILED DESCRIPTION

Figure 1:
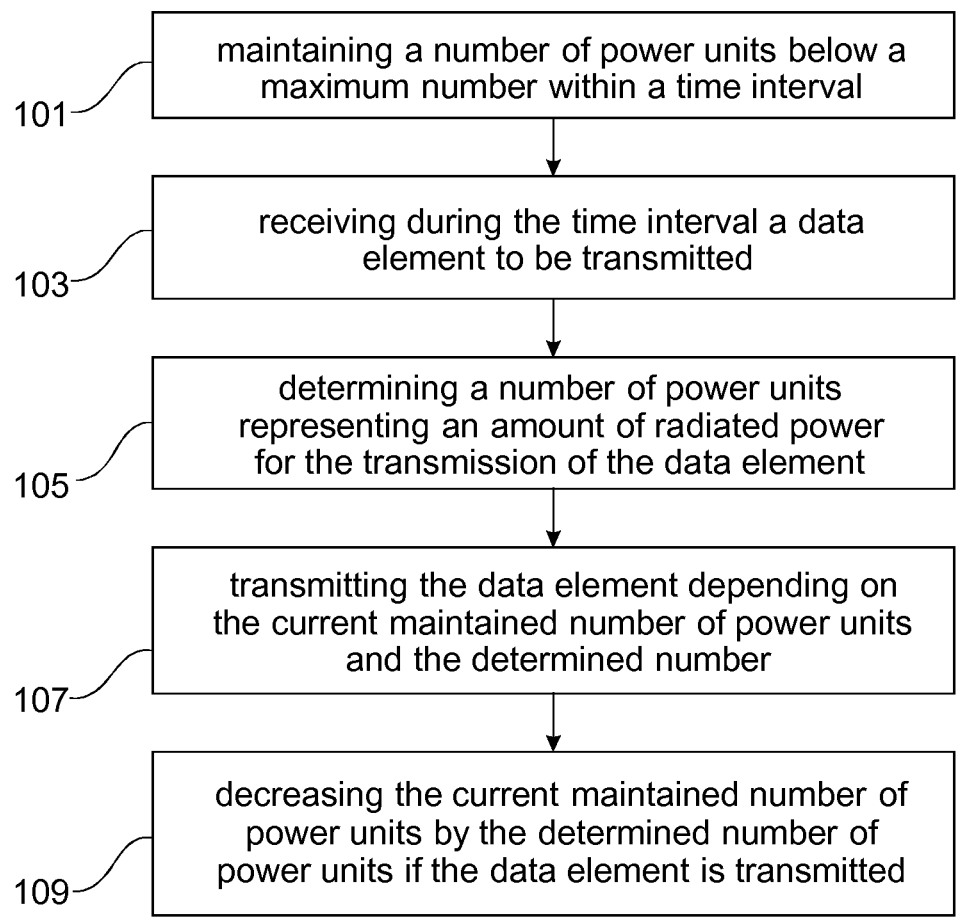
FIG. 1 is a flowchart of a method for controlling RF emissions in accordance with an example of the present subject matter.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

Around base stations, RF compliancy boundaries have been defined based on static RF emissions. The present subject matter may enable to reconsider earlier defined RF exposure compliancy boundaries, taking the dynamics in space and intensity of beamforming into account. The present subject matter may provide an efficient algorithm to keep the time-averaged RF exposure below the required limits and by this fulfill the standards and regulations.

For example, a network node is provided. The network node comprises the apparatus according to the present subject matter. The network node may be a base station. The network node may be a node of a 5G network. The network node may be configured to transmit data elements. In another example, the apparatus may be outside the network node having an interface to the network node e.g. for receiving data elements from the network node via the interface.

A power unit may represent an amount of power e.g. a power unit may be 10 Watts. For example, if the power unit is 10 Watts and the current maintained number of power units is 100, the equivalent amount of power represented by the current number of power units is 1000 Watts. In another example, the power unit may represent an amount of effective isotropic radiated power (EIPR) or effective radiated power (EPR) e.g. a power unit is 20 EPRs.

The power units may be stored in a buffer such as a bucket. The size of the bucket may be determined by the maximum number i.e. the bucket may hold at the most a number of power units equal to the maximum number. The bucket may be empty if no power units are currently maintained. The bucket may be partly full or full. If a new power unit is to be stored in the bucket when it is full, an error may be occurred or the power unit may be discarded. The power unit may be stored/used as a token in the bucket. The power units may be stored in respective regions of the bucket. The bucket may enable a power unit counter. This may enable an easy mechanism to manage high-priority traffic like public safety or emergency information: a data transmission budget can either be exceeded or a part of the budget can be reserved, or a combination of both can be used. The reserve may be realized by defining a minimum power unit's inflow rate and to configure a bucket size which is lower than the configured power unit's inflow rate. This may guarantee that there is always capacity available for high priority traffic and that the bucket limit is not exceeded.

In another example, the power units may be stored in a container. Each element of the container may comprise a power unit. The size of the container may be fixed to the maximum number. The container may hold at the most a number of power units equal to the maximum number. Adding further power units to the container after it reached its size may fail.

The present subject matter may enable a flexible scalability. A flexible configuration and dimensioning may allow to adapt the method to smaller granularities than on cell-level, like the cell-segment or solid angle.

The data element may be a number of digits. For example, the data element may be an electric signal representing data messages stored in memory with a defined number of digits. In one example, the data element may be the smallest amount of information that can be transmitted at once. In another example, the data element may comprise multiple sub-elements. The sub-elements may for example be received as part of a stream of data.

Determining the number of the power units representing an amount of radiated power for the transmission of the data element may, for example, be performed as follows. The amount of radiated power may be the power needed for the transmission of the data element by an RF source/radio transmitter for transmitting the data element. For example, the amount of radiated power may be the power needed for the transmission of the data element by the radio transmitter in the direction of the radio transmitter's strongest beam. That is, the power needed for the transmission of the data element may be defined using the direction of maximum signal strength (the "main lobe") of a radiation pattern of the radio transmitter.

The maintaining of the number of power units below (maintaining them smaller than or at most equal to) the maximum number within the time interval is performed so that maximum number is not exceeded during the time interval.

According to an example, the maintaining comprises: dividing the time interval into multiple frames; increasing the number of power units during each frame of the time interval using a respective unit accumulation rate.

The unit accumulation rate is a number of power units per time unit. For example, the unit accumulation rate may be the number of power units per frame. For example, the time interval may be a current time interval, e.g. a current week, during which the present method may be performed. The frame of the time interval may be a day of the week. Maintaining the number of power units during the time interval below the maximum number may be performed by determining an accumulation rate based at least on the maximum number and the duration of the time interval. The maximum number provides a first constraint for the determination of the unit accumulation rate. For example, the unit accumulation rate may be equal to the maximum number divided by the number of frames in the time interval e.g. if the maximum number is 700 the rate in each frame (day) may be 100 power units per frame. Every day of the week, 100 power units may be added e.g. at day 4, the accumulated number is 400 if no transmission of data is occurred during the first three days. In one example, if a data element to be transmitted is received at day 4 requires 700 power units, the rate of day 4 may be increased so that the additional 300 power units may be added and the data element transmitted; however, this reaches the maximum allowed per week which is 700, and thus the next days, 5, 6 and 7 of the week no units may be added. In another example, the data element may wait till end of the week for having the accumulated amount of 700 power units in order to be transmitted. In another example, in case of a burst arriving at the first day and needs all 700 power units of the week the 700 power units may be used in the first day and no power units are left for the remaining days of the week e.g. thresholds may be added to always keep some power units for the remaining duration of the time interval. This may allow to transmit burst traffic up to a certain burst rate, avoiding that the allowed maximum is exceeded over the required time interval.

The example of week is given for simplification of the description only but it is not limited to. The time interval may be expressed in different time units such as hours, seconds, minutes etc.

This example, may enable a systematic and efficient method for controlling RF emissions during the time interval.

According to an example, the unit accumulation rate is a predefined constant rate. For example, if the maximum number is 700 power units, the unit accumulation rate may be 100 power units per day so that during every current day of the current week 100 power units may be added to the current accumulated number of power units. Having a constant rate may save processing resources that would otherwise be required by a dynamic change of the rate.

According to an example, the method further comprises repeating the controlling of the RF emissions for one or more time intervals subsequent to the time interval. This may enable a continuous control of the RF emissions. The time interval may be a sliding window that is slide by a predefined slide interval e.g. the slide interval may be equal to the frame. The sliding window may enable to control that the maximum number is not exceeded.

According to an example, the repeating of the controlling of the RF transmissions for a current time interval comprising: for each current frame of the current time interval determining the unit accumulation rate using the number of decreased power units during a frame of the previous (last) time interval that corresponds to the frame, and increasing the number of power units during the frame using the determined unit accumulation rate.

For example, the unit accumulation rate may dynamically be determined for the current week, using the history of what occurred during the last week. For example, if during the fifth day of the last week, 500 power units have been used for the data transmission, the accumulation rate for the fifth day of the current week is 500 power units during the fifth day. This provides a second constraint in addition to the first constraint for determining the unit accumulation rates for the remaining days of the current week. That is, the fifth day has to have a rate of 500 power units during the day and in addition, the maximum number of power units in the current week should not exceed 700 power units. Thus, after the first week, the rate for the second week may depend on the usage of power units in the first week.

This may save processing resources such as storage resources because the power units are not maintained for a long time period in the apparatus e.g. the 500 power units are only added in the fifth day of the current week, so that during the first four days of the current week less than 200 units may be accumulated in the apparatus.

According to an example, the determined unit accumulation rate being equal to the rate of decreased number of power units.

According to an example, the method further comprises providing a first and second ring-buffer, wherein the first ring-buffer has a first part and a second part, each of the parts having a number of elements which corresponds to the number of frames in the time interval, the second ring-buffer having a number of elements which corresponds to the number of frames in the time interval, wherein each element of the first part respectively represents the number of power units which are available during the respective frame, the second part comprising a copy of the first part, each element of the second ring-buffer representing the number of decreased power units in a respective frame of the time interval, wherein the determining of the unit accumulation rate comprises determining one element of the second part that corresponds to the current frame and using the number of power units represented by the element per frame as the unit accumulation rate.

This may enable an automatic execution of the present method. This may save processing time that would otherwise be required by an ad-hoc determination of the unit accumulation rates for each time interval. The first buffer may enable to obtain the rate that can be used in each current frame of the time interval based on what occurred last time interval.

According to an example, the transmitting comprises: in case the current maintained number of power units is higher than or equal to the determined number of power units, transmitting the data element, otherwise waiting until the maintained number of power units reaches the determined number of power units for enabling the transmission of the data element.

In another example, if the difference between the determined number of power units and the current maintained number of power units is higher than a predefined threshold, the data element may be transmitted, otherwise the data element may not be transmitted.

This threshold (or reserve) may enable to service high-priority traffic like public safety or emergency information. For example, in a situation where a data element has been transmitted using more power units than the unit accumulation rate, resulting in the bucket being not filled completely anymore, the threshold provides a sufficient number of power units in the bucket so all the needs of other data elements can be served. This may avoid that one data element takes all maintained power units, by limiting the number of granted power units per data element.

According to an example, the method further comprises in response to determining that the waiting is performed for a waiting time period that is longer than a predefined maximum waiting time threshold discarding the data element. This may save processing resources in the apparatus that would otherwise be required for maintaining the data element waiting for a long period.

According to an example, the data element comprises multiple data sub-elements. The method further comprises sorting the multiple sub-elements, and performing the transmitting of the data element depending on the current maintained number of power units and the determined number and the decreasing of the current maintained number of power units individually for the multiple sub-elements following the sorting order. This may enable to efficiently manage data transmission when multiple data sub-elements are competing for transmission and the maintained number of power units may not be sufficient to serve all of them.

According to an example, the sorting is performed using a time of reception of the data sub-elements and/or a traffic priority value of the data sub-elements, the traffic priority value of a data sub-element indicating a priority of transmission of the data sub-element.

According to an example, the receiving further comprises receiving another data element to be transmitted, wherein each of the data element and the another data element comprises multiple data sub-elements, wherein the transmitting of the data element depending on the current maintained number of power units and the determined number comprises transmitting the received data elements by determining for each data sub-element of the data elements the number of power units representing an amount of radiated power required for the transmission of the data sub-element, and transmitting the same number of sub-elements of the two data elements based on the current maintained number of power units.

This may enable that for all data elements, the same number of sub-elements is transmitted. The power units are equally granted to the data elements so that for each data-element the same number of sub-elements can be transmitted.

These examples may enable a EIRP budget balancing in multi radio technology applications. In such applications, the EIRP budget has to be considered for all technologies. Each frequency and technology contribute with a different share to the overall EIRP budget.

According to an example, each of the maintained power units indicates a constant or variable amount of power for data transmission. For example, for indicating a variable amount of power, the power unit may be changed for each time interval e.g. in the first week the power unit may be 10 Watts, in the second week the power units may be 20 Watts etc. This may further improve the control aspect of the present subject matter.

In another example, a method comprises maintaining a number of power units below a maximum number within a time interval, wherein a power unit of the power units is indicative of an amount of radiated power for transmission of data by said power unit; receiving during the time interval a data element to be transmitted; determining a number of the power units for transmission of the data element, the number of the power units representing an amount of radiated power for the transmission of the data element; transmitting the data element depending on the current maintained number of power units and the determined number; and decreasing the current maintained number of power units by the determined number of power units if the data element is to be transmitted.

FIG. 1 is a flowchart of a method for controlling RF emissions in accordance with an example of the present subject matter. For example, the method may be used to control the RF emissions of a base station during a time interval. This may be useful as the number of macrocell mobile telephony base station antennas emitting RF electromagnetic radiation in residential areas has increased significantly.

A number of power units may be maintained in step 101 below a maximum number within the time interval e.g. the maximum number may be reached but not exceeded during the time interval. A power unit of the power units is indicative of an amount of radiated power for transmission of data by said power unit. For example, the power unit may be equivalent to the RF emitted or a power need when transmitting a piece of information over an air-interface of a base station. The power unit may for example be quantified in term of the equivalent isotropic radio power (EIPR) or equivalent radio power (EPR).

The maximum number may be determined based on recommendations on the exposure guidelines of the general public to RF emissions. The maximum number is defined for the time interval. For example, FIG. 2A illustrates the maintaining step 101. The time interval may be a week 201.1-N. The time interval may be the current week referred to as week 1 in FIG. 2A.

The number of power units may be accumulated during the week using a predefined unit accumulation rate such that the accumulated number of power units stays at any point of time in the week below the maximum number. For example, if the maximum number is 70 power units per week, the power units may be accumulated so that the total number of power units accumulated in the week is smaller <=70. For that, the week may be split into frames 203 (e.g. days) and in every day of the week 201.1 a number of power units may be accumulated. As indicated in FIG. 2A every day the same amount of power units (e.g. 10) is added e.g. added as tokens in a bucket. This is indicated in FIG. 2A where in the first day, 10 powers units 205 are currently accumulated, the second day 20 current power units accumulated etc. This may ensure that at the end of the week the current number of power units 205 is 70. For simplification of the description of step 101, FIG. 2A shows that none of the power units is used for data transmission.

In another example, the unit accumulation rate may be user defined e.g. a user may define every day the number of power units to be added. For example, the number of power units in the $4^{th}$ day is 30 power units that have been accumulated from the first three days and 10 power units that are obtained using the rate associated with the 4th day. In addition, the $4^{th}$ day may also receive the remaining 30 power units of the week. This may result in nothing left-over for the remaining days of the week (which are days 5/6/7). That is, no power units may be added in the last three days since the maximum number of 70 is already reached in day 4.

For example, a container may be created, wherein each element of the container may comprise an added power unit. The size of the container may be fixed to the maximum number. In this way an attempt to add further power units after it reached its size may fail. The container has a capacity equivalent to a RF-emission or RF-transmission-power budget, which is a maximum allowed RF-emission/RF-transmission-power over the time interval.

In another example, the power units may be accumulated in a single number e.g. the amount of power of each accumulated power unit may be summed with the current amount of power 205.

Figure 2B:
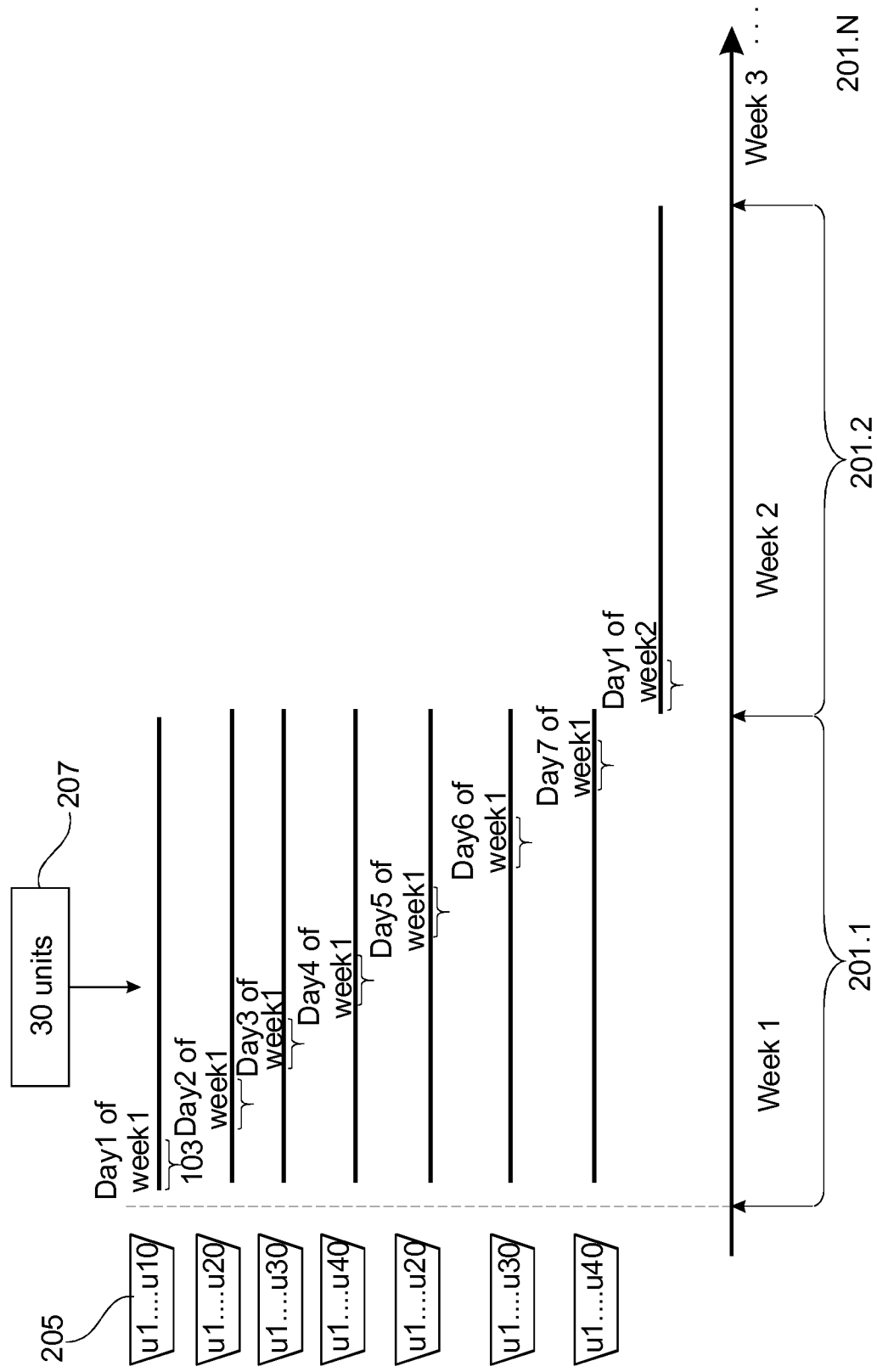
FIG. 2B depicts a diagram illustrating a method for managing power units in accordance with an example of the present subject matter.

A data element 207 to be transmitted may be received in step 103 during the current time interval. The current time interval may for example be the first week 201.1 as indicated in FIG. 2B. At the reception time of the data element 207, the current number 205 of power units is 40 power units as indicated in FIG. 2B.

A number of the power units for transmission of the data element may be determined in step 105, wherein the number of the power units represent an amount of radiated power for the transmission of the data element. As shown in FIG. 2B, the transmission of the data element may for example radiate a power that is equivalent to 30 power units.

The data element 207 may be transmitted in step 107 depending on the current maintained number of power units and the determined number. For example, a comparison between the determined number and the current maintained number of power units may be performed. Based on the comparison results, the data element 207 may be transmitted. Following the example of FIG. 2B, the determined number of 30 power units may be compared with the current maintained number of power units 205 of the $4^{th}$ day which is 40 power units.

In one example, if the determined number of power units is smaller than or equal to the current maintained number of power units 205, the data element may be transmitted.

In another example, only if the difference between the determined number of power units and the current maintained number of power units 205 is higher than a predefined threshold, the data element may be transmitted. This threshold may enable to service high-priority traffic like public safety or emergency information.

Figure 7:
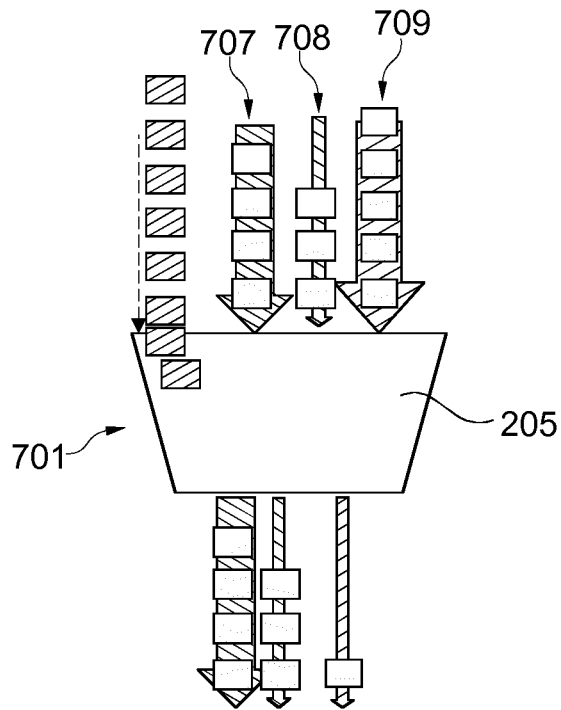
FIG. 7 is a block diagram illustrating a method for transmitting data elements in accordance with an example of the present subject matter.
Figure 8:
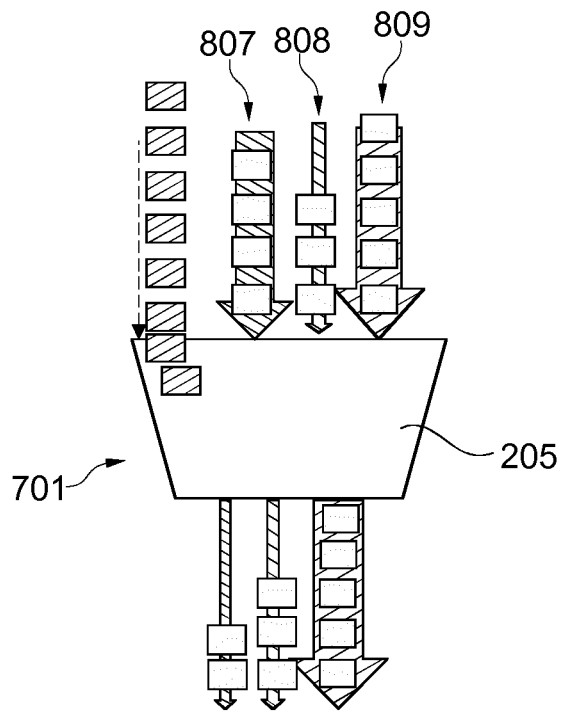
FIG. 8 is a block diagram illustrating a method for transmitting data elements in accordance with an example of the present subject matter.
Figure 9:
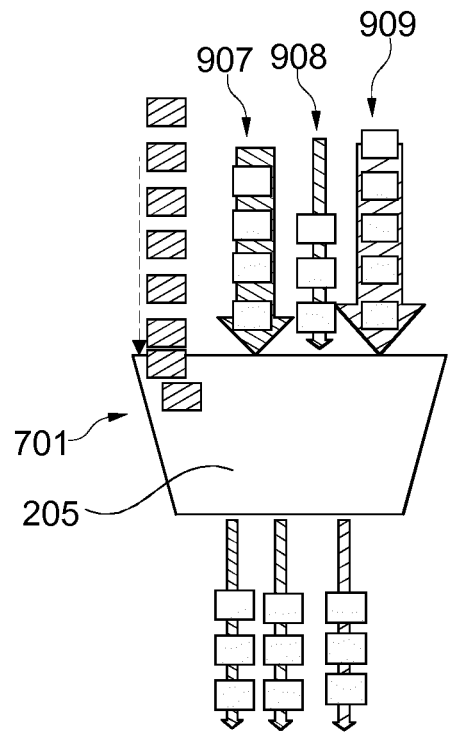
FIG. 9 is a block diagram illustrating a method for transmitting data elements in accordance with an example of the present subject matter.

FIG. 7-9 provide further examples for the transmission of the data element 207.

The current maintained number of power units may be decreased in step 109 by the determined number of power units if the data element is transmitted. For example, the decreasing step 109 may be performed after or in parallel to the transmission of the data element. Following the example of FIG. 2B, 30 power units may be deduced from 40 power units currently available in the $4^{th}$ day.

Figure 3:
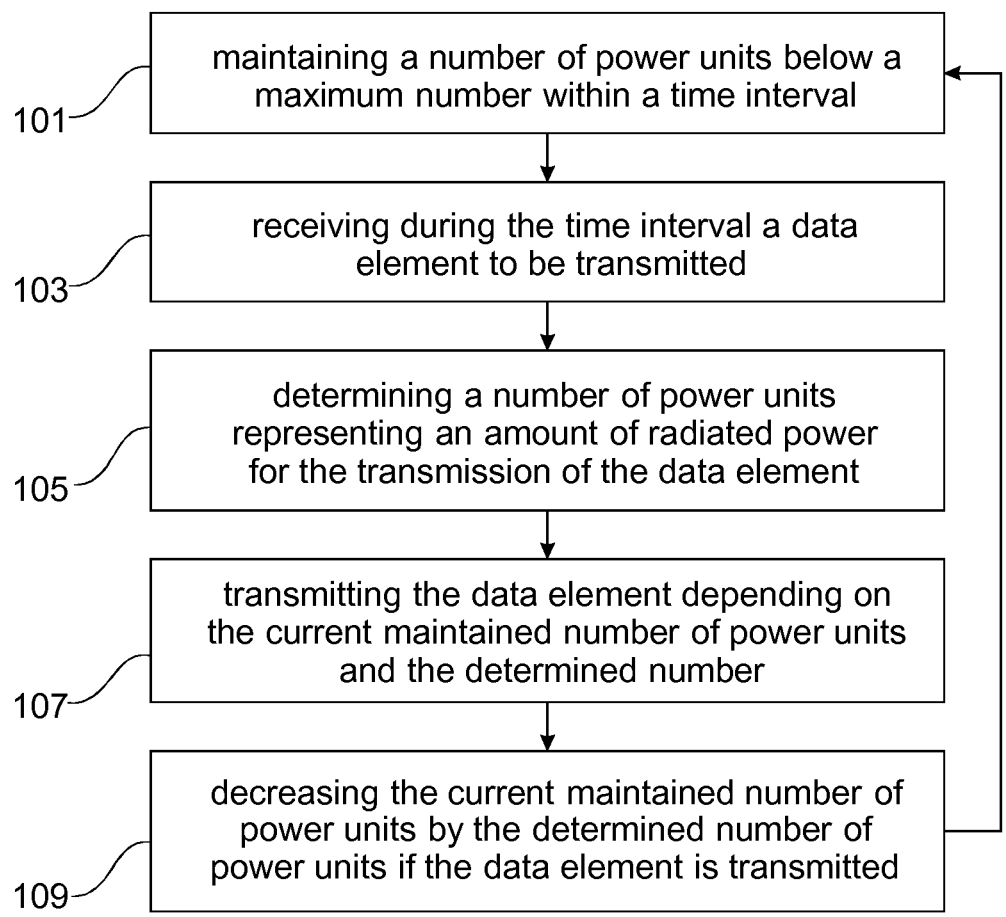
FIG. 3 is a flowchart of a method for controlling RF emissions in accordance with an example of the present subject matter.

FIG. 3 is a flowchart of a method for controlling RF emissions in accordance with an example of the present subject matter. FIG. 3 comprises the method of FIG. 2. In addition, steps 101-109 are repeated in FIG. 3 for further time intervals. This may enable a continuous monitoring of the RF emissions. The time intervals are successive time intervals e.g. forming consecutive weeks of a year, or consecutive days of a month etc.

Figure 4:
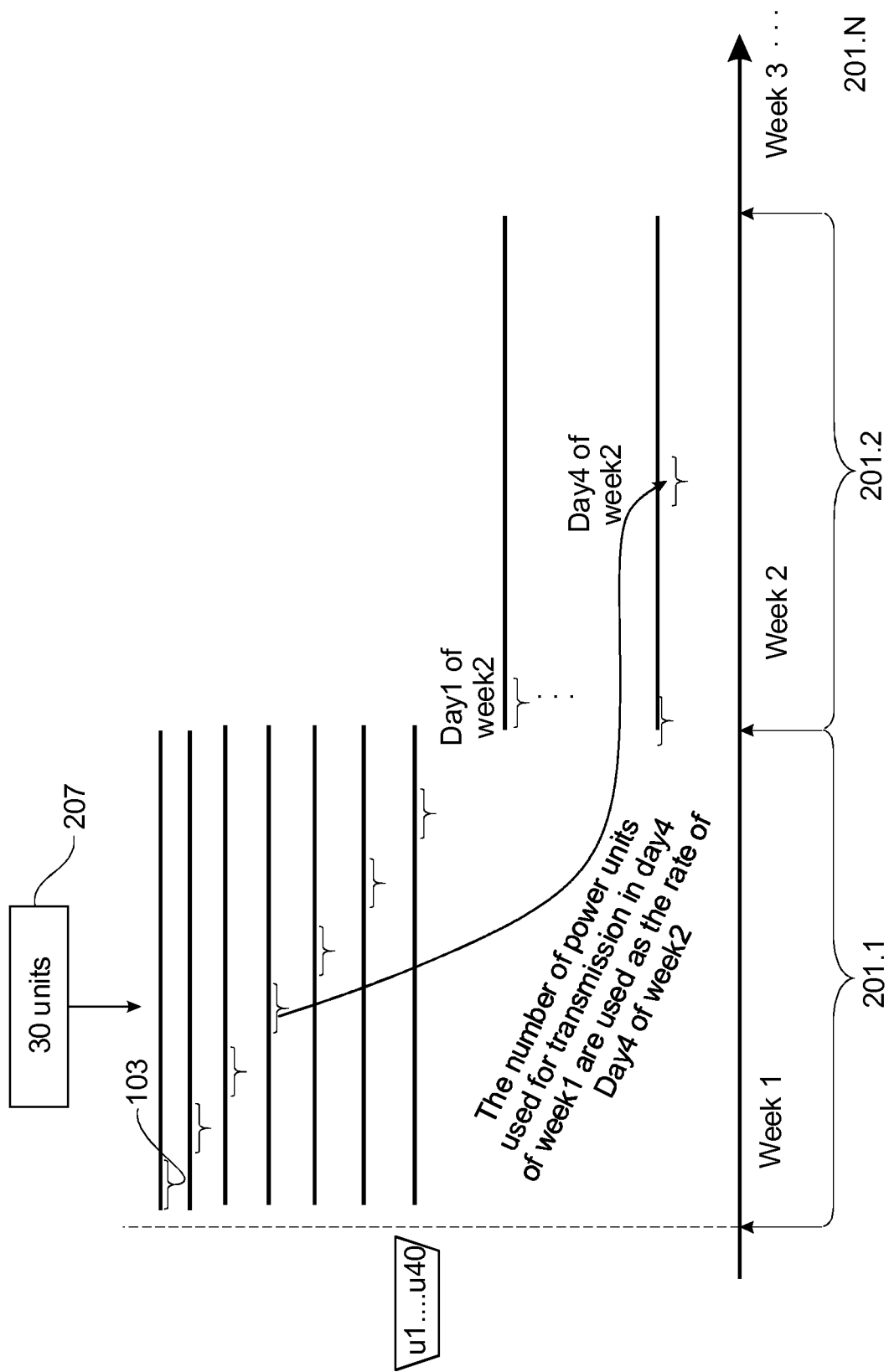
FIG. 4 depicts a diagram illustrating a method for managing power units in accordance with an example of the present subject matter.

Following the example of FIG. 2B and as indicated in FIG. 4, the first execution of steps 101-109 resulted in a current number of accumulated power units 205 which is 40 power units. The repetition of steps 101-109 for the subsequent time interval 201.2 (second week) may use a unit accumulation rate for accumulating the power units during the second week. The unit accumulation rate may be defined based on how the current accumulated power units 205 have changed during the first week e.g. due to data transmission.

For example, during the first week, data has been transmitted in the $4^{th}$ day of the week. This may be used to define the number of power units to be added in the $4^{th}$ day of the current week 201.2 which is the second week. For example, it may be determined that the same number of power units 30 used for data transmission in the $4^{th}$ day of the first week may be made available at the $4^{th}$ day of the current week. That is, the unit accumulation rate for the second week may be constrained by two constraints. The first constraint requires that the maximum number per week is 70 power units. The second constraint requires that the $4^{th}$ day has to have 30 available power units. The second constraint may be based on the fact that the data transmission behavior during a week may be similar in following weeks. For example, during the first day, 6 power units may be added, during the second days 10 power units may be added, and during the third day 7 power units may be added. If these power units were not used at all in the first three days of the current week, 7 power units may be added in the $4^{th}$ day of the current week to reach the 30 power units, leaving only 40 power units that can be added in the remaining days of the current week. If for example all the 23 power units of the three days have been used for data transmission, then 30 power units may need to be added in the $4^{th}$ day, leaving only 17 power units that can be added in the remaining days of the current week.

In another example, a third constraint may be used. The third constraint may require that the remaining power units of the previous week to be used as the number of power units for the first day of the current week. Following the example of FIG. 4, 40 power units may be added in the first day of the current week. For example, if all these 40 power units have been used during the first day of the current week, this may leave only 30 power units due to the first constraint. And the second constraint requires that the 30 power units be added in the $4^{th}$ day of the current week. Thus no power units may be added in the other 5 days of the current week. If the third constraint does not allow to find a rate for this week it may not be used.

Figure 5:
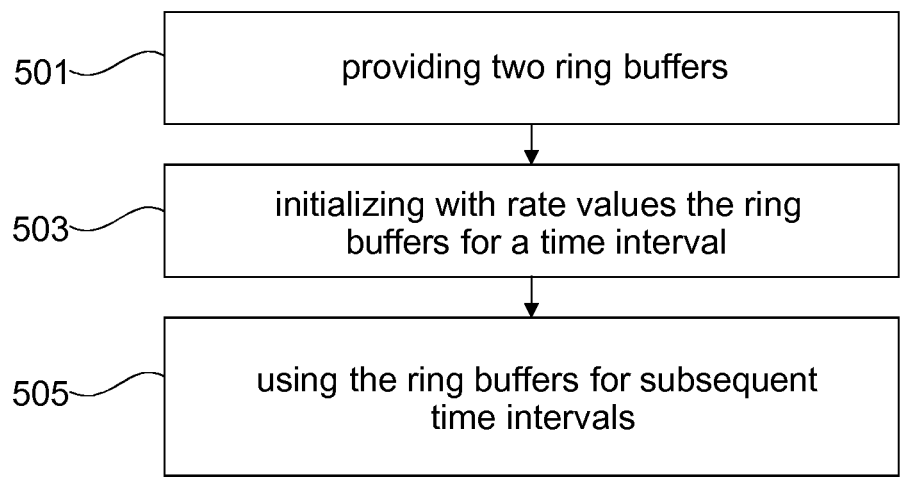
FIG. 5 is a flowchart of a method for determining the unit accumulation rate in accordance with an example of the present subject matter.

FIG. 5 is a flowchart of a method for determining the unit accumulation rate in accordance with an example of the present subject matter. FIG. 5 will be described with reference to FIGS. 6A-F.

A first 611 and second 612 ring-buffer may be provided in step 501. The first ring-buffer 611 has a first part 611A and a second part 611B. Each of the first and second parts has a number of elements which corresponds to the number of frames in the time interval. In addition, the first ring-buffer is provided with an end-element 613 that stores the power units that have been used in a current time frame. For example, assuming that element b1 as shown in FIG. 6C corresponds to the current time frame and 15 power units have been used for data transmission. This leaves only 5 power units in the element b1 and the end-element 613 would store 15 units that have been deduced from b1. Once b1 is shifted the value 5 of b1 would be combined with the content of the end-element 613 to obtained 15+5 as indicated in FIG. 6D.

The first ring buffer may store the number of power units that corresponds to the rate of the respective time frame and maintained at each time frame of the time interval during which the RF emission has been controlled. The first part (front) 611A represents the amount of power units which are available during the period of the time interval to be granted. The second part (back) 611B acts as a 'mirror' or 'copy' of the front part to keep the power units content history for the time interval.

The second ring-buffer 612 has a number of elements which corresponds to the number of frames in the time interval. Following the example of FIG. 2A, the first ring may have 15 elements and the second ring may have 7 elements which corresponds to the number of days per week.

The first ring-buffer may be initialized in step 503. The elements of the first ring-buffer may be initialized before starting the execution of the method e.g. of FIG. 3 with the unit accumulation rates that have been initially defined for enabling the first execution of steps 101-109 of FIG. 3. For example, the unit accumulation rate may be defined so that 20 power units to be added in each time frame (day) of the first week 201.1.

Thus, the elements of the first and second part may each comprise the value 20. This may enable access to meaningful values of the rates. In another example, any value may be used to initialize the first ring buffer 611.

After initializing the first ring-buffer 611, the two buffers 611 and 613 may be used during the method for controlling the RF emissions as described with reference to FIG. 3. That is, for each processed time frame during the first/initial execution of steps 101-109 during the first week, the buffer elements of the first and second buffers 611 and 612 are shifted by one, and their content is used to add power units for the processed time frame before shifting. The content of the buffer elements of the first and second buffers 611 and 612 may be updated/changed (before they are shifted) according to the number of power units that has been potentially used for data transmission during the processed time frame.

Figure 6A:
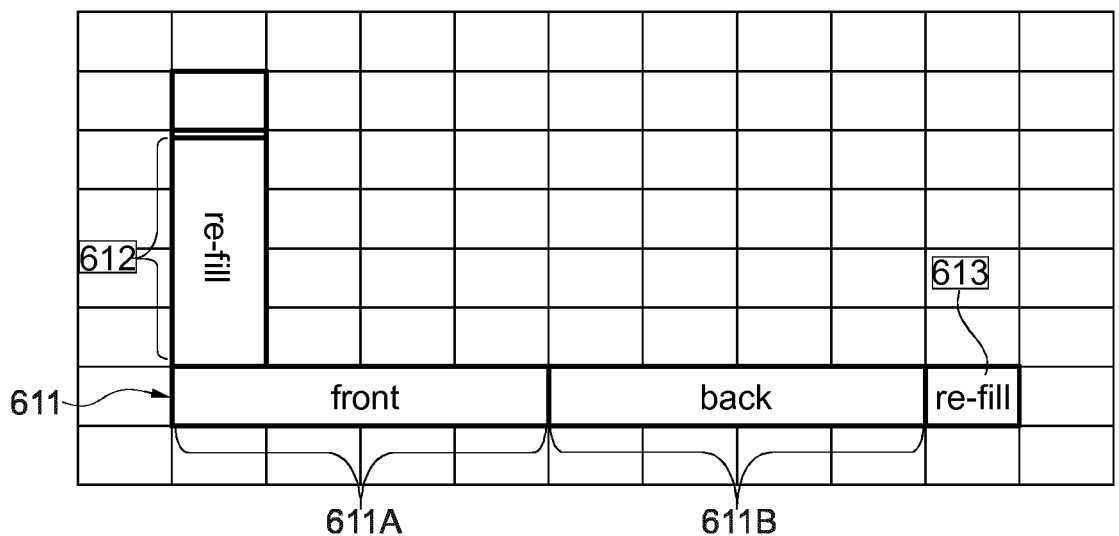
FIG. 6A depicts a block diagram describing two ring buffers in accordance with the present subject matter.
Figure 6B:
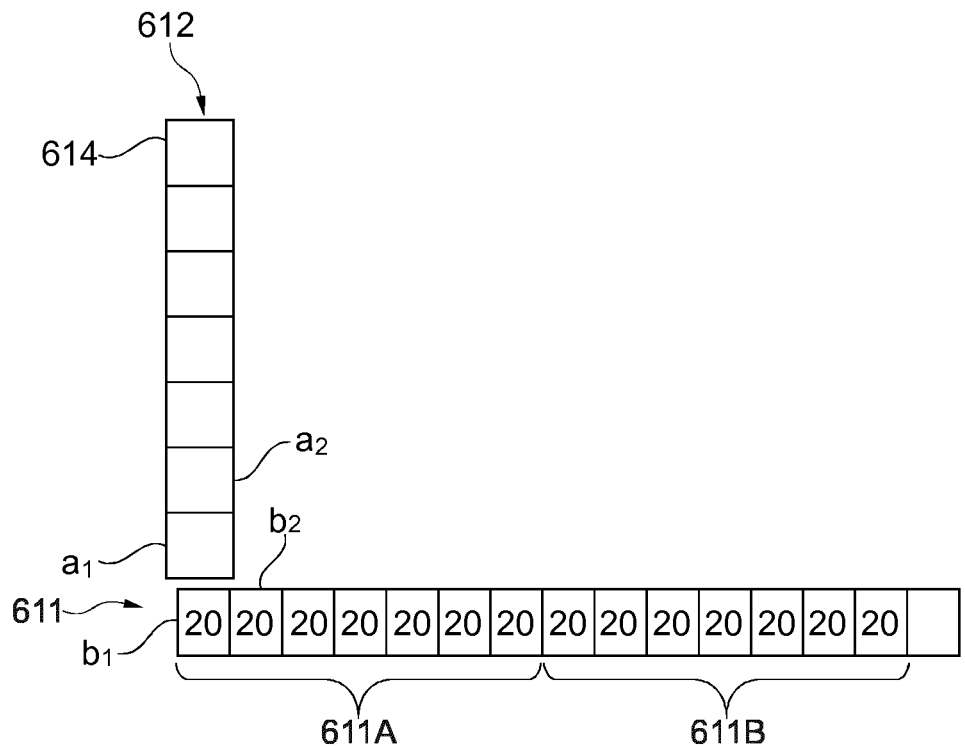
FIG. 6B depicts a block diagram describing the status of the ring buffers during execution of an example of the present subject matter.
Figure 6C:
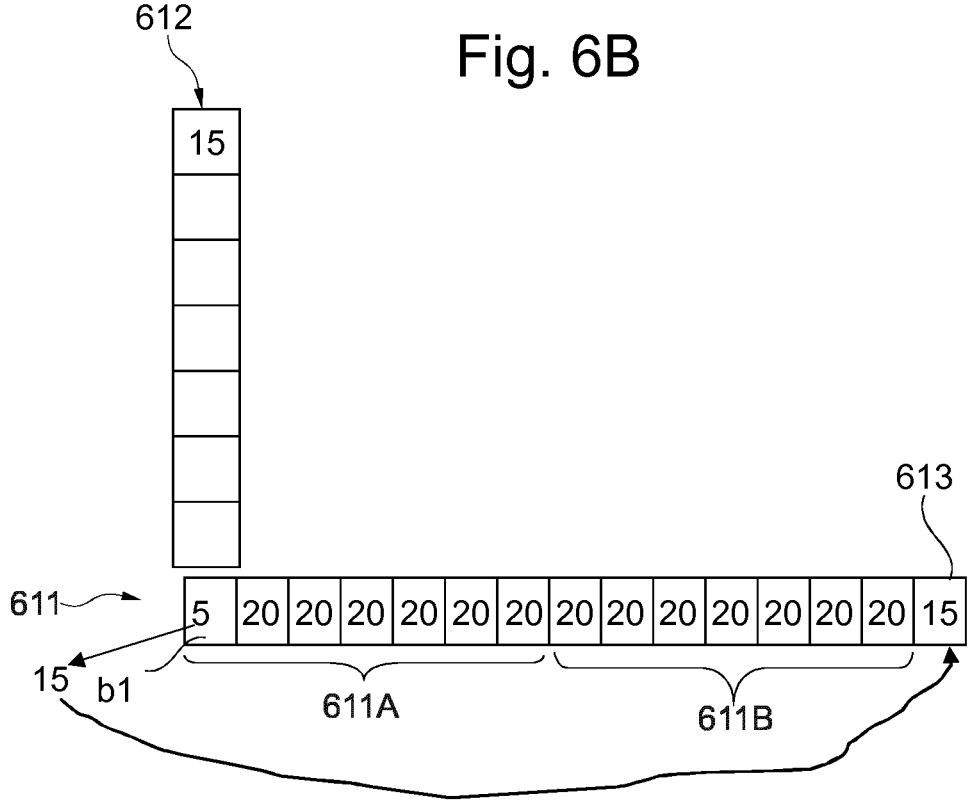
FIG. 6C depicts a block diagram describing the status of the ring buffers during execution of an example of the present subject matter.
Figure 6D:
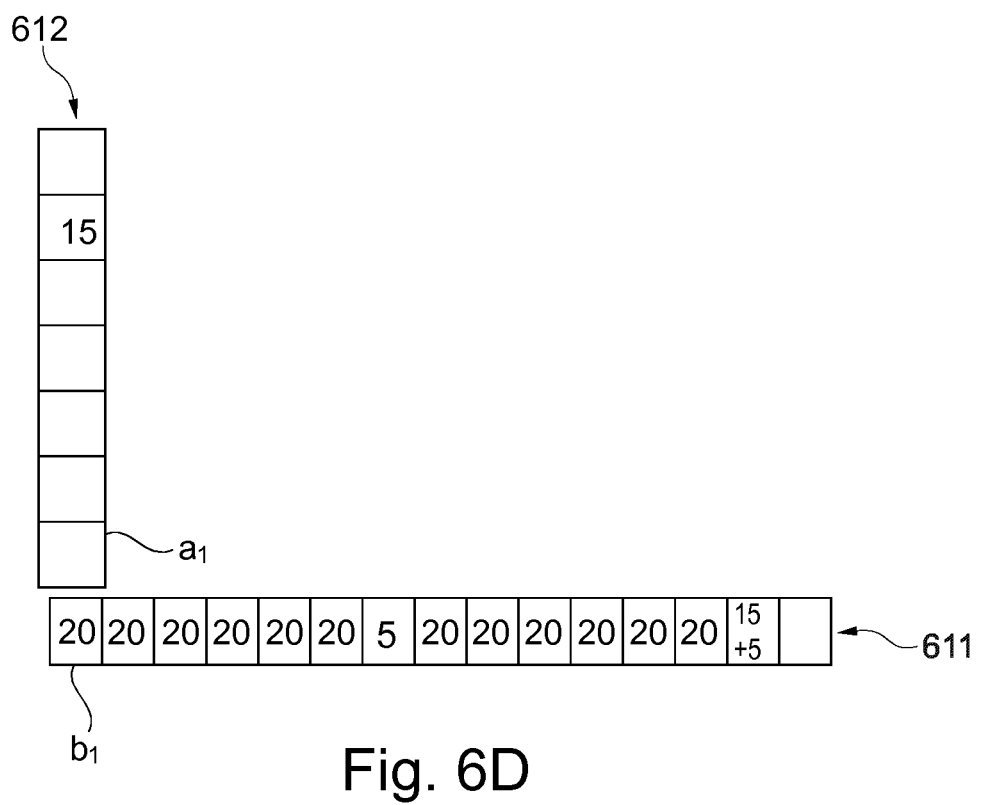
FIG. 6D depicts a block diagram describing the status of the ring buffers during execution of an example of the present subject matter.

For example, as shown in FIG. 6B, for a current time frame, two elements of the first and second ring-buffers respectively may be modified if data is transmitted during this time frame. These two elements are element b1 and the first element 614 of the second ring-buffer. Element b1 may be used to determine the number of power units that define a rate in a corresponding time frame of a last week. After processing the elements b1 and 614, the two buffers may be shifted by one element so that element b2 of the first ring-buffer and the first element 614 of the second ring-buffer become the current elements to be processed for the current time frame.

FIG. 6C shows the status of the two buffers for the $1^{st}$ day of the first week. During this day, 15 power units have been used for data transmission. These 15 power units would then be added to the first element 614 of the second ring buffer 612 and the end-element 613 as indicated in FIG. 6C. The second ring-buffer of FIGS. 6C-F contains only one element having a value 15 because, in accordance with this example, the data is transmitted only once during one time frame of the first week.

FIG. 6D shows the status of the two buffers 611 and 612 in the second day of the first week 201.1. The element b1 of FIG. 6C is shifted because it corresponds to the first day and the element 613 is shifted so that they add their content (15+5) as shown in FIG. 6D.

Figure 6E:
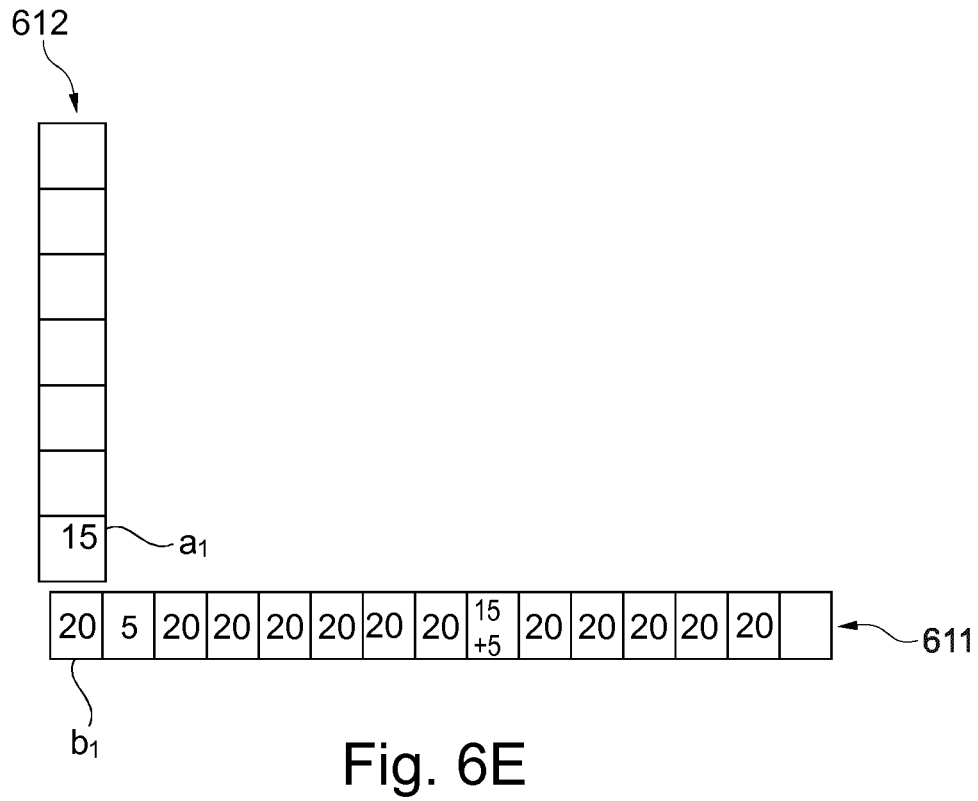
FIG. 6E depicts a block diagram describing the status of the ring buffers during execution of an example of the present subject matter.

FIG. 6E shows the status of the two buffers 611 and 612 in the seventh day of the first week 201.1.

Figure 6F:
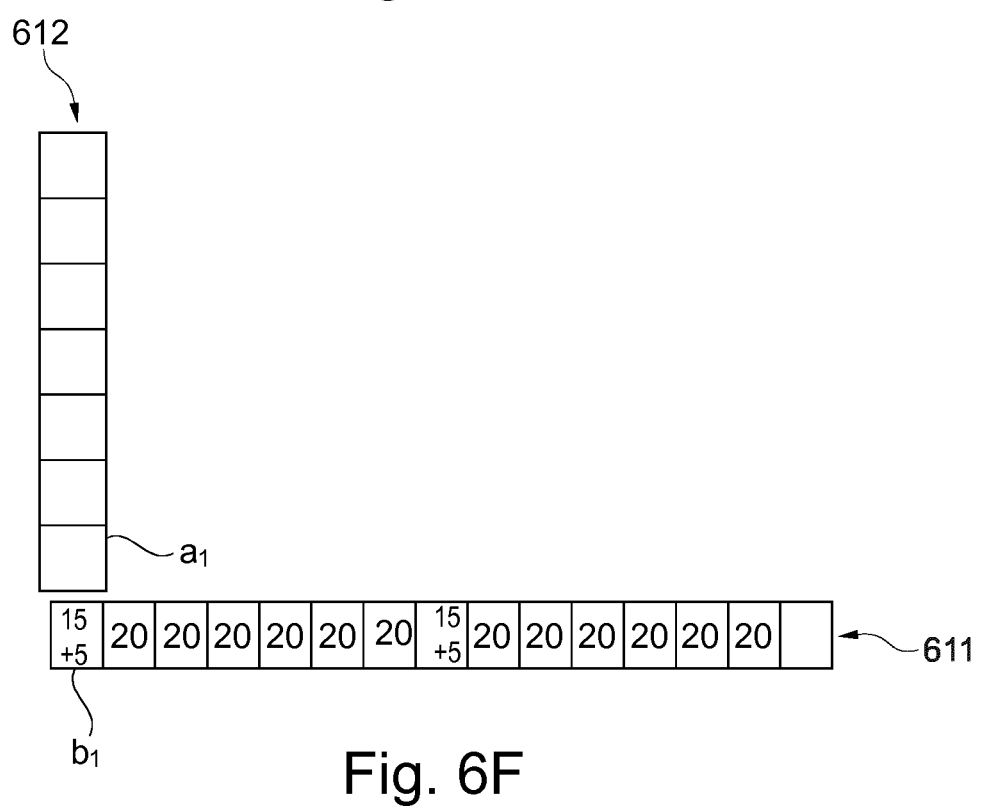
FIG. 6F depicts a block diagram describing the status of the ring buffers during execution of an example of the present subject matter.

FIG. 6F shows the status of the two buffers 611 and 612 after completing the first execution of steps 101-109 for the first week 201.1. The two buffers of FIG. 6F may be used for a next iteration of the method steps 101-109 e.g. for the second week 201.2. For example, for the first time frame of the second week to be processed, the current content of end-element b1 may be used to determine the unit accumulation rate for the first time frame of the second week which may be 20.

FIG. 7 is a block diagram illustrating a method for transmitting data elements in accordance with an example of the present subject matter.

There are three incoming traffic streams 707, 708 and 709 with a certain demand of power units. Each traffic stream may represent a data element. And the content of each stream may be sub-elements of the data element (e.g. sub-element may need one power unit in order to be transmitted). The power units are indicated on the left of the streams as entering the buckets one by one power unit. And the power unit counter 701 has reached its limit or there are not sufficient tokens or power units left for all streams, and the transmission of further traffic flows may be throttled. Therefore, there is a 'competition' for power units. The traffic stream 707 requires four power units. The traffic stream 708 requires three power units. The traffic stream 709 requires five power units.

In case several traffic flows compete for the left number of power units, a priority handling may be introduced. The priority handling of FIG. 7 is based on '1st come, 1st serve'. The last one gets the rest or even nothing. In FIG. 7, the most left stream 707 represents the 1st incoming stream, the most right stream 709 is the last incoming stream. The arrows below the counter 701 show the traffic streams after they have taken their units need from the bucket. It indicates that only part of the last stream is transmitted since it has the lowest priority and the other streams have used most of available power units.

FIG. 8 is a block diagram illustrating a method for transmitting data elements in accordance with an example of the present subject matter.

There are three incoming traffic streams 807, 808 and 809 with a certain demand of power units. And the power unit counter 701 has reached its limit there are not sufficient tokens left for all streams, and the transmission of further traffic flows has to be throttled. Therefore, there is a 'competition' for power units. The traffic stream 807 requires four power units. The traffic stream 808 requires three power units. The traffic stream 809 requires five power units.

The priority handling of FIG. 8 is based on traffic-priority. There may be traffic with higher priority than the other. The high-priority traffic is served first, the lower traffic flows have to compete for the remaining tokens. In FIG. 8, the most right traffic stream 809 has the highest priority, the most left traffic 807 has the lowest priority.

The arrows below the counter 701 show the traffic streams after they have taken their needs from the bucket in accordance with the priority. Thus, the data element with the highest priority may first get his needed power units once they are available. The other data elements have to wait (they are delayed) until sufficient amount of power units is available.

FIG. 9 is a block diagram illustrating a method for transmitting data elements in accordance with an example of the present subject matter.

There are three incoming traffic streams 907, 908 and 909 with a certain demand of power units. And the power unit counter 701 has reached its limit there are not sufficient tokens left for all streams, and the transmission of further traffic flows has to be throttled. Therefore, there is a 'competition' for power units. The traffic stream 907 requires four power units. The traffic stream 908 requires three power units. The traffic stream 909 requires five power units.

The priority handling of FIG. 9 requires that the remaining power units are equally granted to each flow 907, 908 and 909. In FIG. 9, each outgoing traffic flow has got same number of power units.

Figure 10:
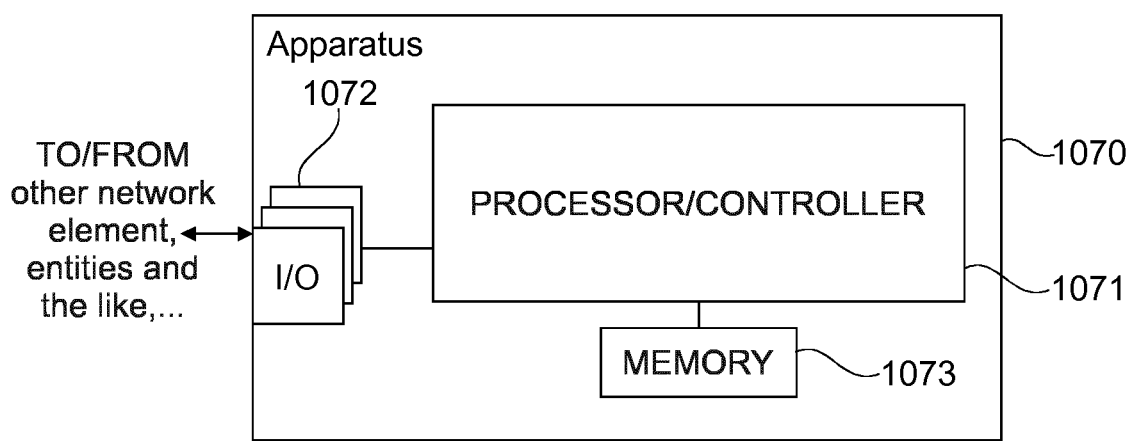
FIG. 10 is a block diagram showing an example of an apparatus according to example of the present subject matter.

FIG. 10 is a block diagram showing an example of an apparatus according to example of the present subject matter.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus, or the like. The apparatus 1070 may comprise a processing function or processor 1071, such as a CPU or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIGS. 1, 3 and 5.

The processor 1071 is configured to maintain a number of power units below a maximum number within a time interval, wherein a power unit of the power units is indicative of an amount of radiated power for transmission of data, receive during the time interval a data element to be transmitted, determine a number of the power units representing an amount of radiated power for the transmission of the data element; transmit the data element depending on the current maintained number of power units and the determined number, and decrease the current maintained number of power units by the determined number of power units if the data element is transmitted.

The invention claimed is:

1. An apparatus for controlling radio frequency emissions, the apparatus comprising:
    at least one processor; and
    at least one memory including computer program code;
    the at least one memory and the computer program code configured to, with the at least one processor, cause the apparatus at least to perform:
        maintaining a number of power units below a maximum number within a time interval, wherein a power unit of the power units is indicative of an amount of radiated power for transmission of data;
        receiving during the time interval a data element to be transmitted;
        determining a number of the power units representing an amount of radiated power for the transmission of the data element;
        transmitting the data element depending on the current maintained number of power units and the determined number; and
        decreasing the current maintained number of power units by the determined number of power units if the data element is transmitted.

2. The apparatus of claim 1, wherein the at least one memory and the computer program code are configured, with the at least one processor, to cause the apparatus, at least in part, to perform:
    dividing the time interval into multiple frames;
    increasing the number of power units during each frame of the time interval using a respective unit accumulation rate.

3. The apparatus of claim 1 or 2, wherein the at least one memory and the computer program code are configured, with the at least one processor, to cause the apparatus, at least in part, to perform:
    repeating the controlling of the RF transmissions for one or more time intervals subsequent to the time interval.

4. The apparatus of claim 3, wherein the at least one memory and the computer program code are configured, with the at least one processor, to cause the apparatus, at least in part, to perform:
    for each current frame of the current time interval determining the unit accumulation rate using the number of decreased power units during a frame of the previous time interval that corresponds to the frame, and increasing the number of power units during the frame using the determined unit accumulation rate.

5. The apparatus of claim 1, wherein the at least one memory and the computer program code are configured, with the at least one processor, to cause the apparatus, at least in part, to perform:
    when the current maintained number of power units is higher than or equal to the determined number of power units, transmitting the data element, otherwise waiting until the maintained number of power units reaches the determined number of power units for enabling the transmission of the data element.

6. The apparatus of claim 1, the data element comprising multiple data sub-elements, wherein the at least one memory and the computer program code are configured, with the at least one processor, to cause the apparatus, at least in part, to perform:
    sorting the multiple sub-elements, and performing the transmitting of the data element depending on the current maintained number of power units and the determined number and the decreasing of the current maintained number of power units individually for the multiple sub-elements following the sorting order.

7. The apparatus of claim 1, the at least one memory and the computer program code are configured, with the at least one processor, to cause, where the receiving further comprising receiving another data element to be transmitted; each of the data element and the another data element comprising multiple data sub-elements, wherein the transmitting of the data element depending on the current maintained number of power units and the determined number comprises transmitting the received data elements with determining for each data sub-element of the data elements the number of power units representing an amount of radiated power for the transmission of the data sub-element, and transmitting the same number of sub elements of the two data elements based on the current maintained number of power units.

8. A method for controlling radio frequency emissions, comprising:
    maintaining a number of power units below a maximum number within a time interval, wherein a power unit of the power units is indicative of an amount of radiated power for transmission of data;
    receiving during the time interval a data element to be transmitted;
    determining a number of the power units representing an amount of radiated power for the transmission of the data element;
    transmitting the data element depending on the current maintained number of power units and the determined number; and
    decreasing the current maintained number of power units by the determined number of power units if the data element is transmitted.

9. The method of claim 8, wherein the maintaining comprising:
    dividing the time interval into multiple frames;
    increasing the number of power units during each frame of the time interval using a respective unit accumulation rate.

10. The method of claim 9, wherein the unit accumulation rate is a predefined constant rate.

11. The method of claim 8, further comprising repeating the controlling of the radio frequency emissions for one or more time intervals subsequent to the time interval.

12. The method of claim 11, the repeating of the controlling of the radio frequency emissions for a current time interval comprising:
    for each current frame of the current time interval determining the unit accumulation rate using the number of decreased power units during a frame of the previous time interval that corresponds to the frame, and increasing the number of power units during the frame using the determined unit accumulation rate.

13. The method of claim 12, further comprising providing a first and second ring-buffer, wherein the first ring-buffer has a first part and a second part, each of the parts having a number of elements which corresponds to the number of frames in the time interval, the second ring-buffer having a number of elements which corresponds to the number of frames in the time interval, wherein each element of the first part respectively represents the number of power units which are available during the respective frame, the second part comprising a copy of the first part, each element of the second ring-buffer representing the number of decreased power units in a respective frame of the time interval, wherein the determining of the unit accumulation rate comprises determining one element of the second part that corresponds to the current frame and using the number of power units represented by the element per frame as the unit accumulation rate.

14. The method of claim 8, the transmitting comprising:
when the current maintained number of power units is higher than or equal to the determined number of power units, transmitting the data element, otherwise waiting until the maintained number of power units reaches the determined number of power units for enabling the transmission of the data element.

15. The method of claim 8, the data element comprising multiple data sub-elements, the method further comprising:
sorting the multiple sub-elements, and
performing the transmitting of the data element depending on the current maintained number of power units and the determined number and the decreasing of the current maintained number of power units individually for the multiple sub-elements following the sorting order.

16. The method of claim 15, wherein the sorting is performed using a time of reception of the data sub-elements and/or a traffic priority value of the data sub elements, the traffic priority value of a data sub-element indicating a priority of transmission of the data sub-element.

17. The method of claim 8, the receiving further comprising receiving another data element to be transmitted; each of the data element and the another data element comprising multiple data sub-elements, wherein the transmitting of the data element depending on the current maintained number of power units and the determined number comprises transmitting the received data elements with determining for each data sub-element of the data elements the number of power units representing an amount of radiated power required for the transmission of the data sub-element, and transmitting the same number of sub-elements of the two data elements based on the current maintained number of power units.

18. A non-transitory computer readable medium including a computer program comprising instructions stored thereon for performing at least the following:
maintaining a number of power units below a maximum number within a time interval, wherein a power unit of the power units is indicative of an amount of radiated power for transmission of data;
receiving during the time interval a data element to be transmitted;
determining a number of the power units representing an amount of radiated power for the transmission of the data element;
transmitting the data element depending on the current maintained number of power units and the determined number; and
decreasing the current maintained number of power units by the determined number of power units when the data element is transmitted.

19. An apparatus comprising means for performing a method according to claim 8.

* * * * *